United States Patent [19]
Stothers

[11] Patent Number: 6,098,425
[45] Date of Patent: Aug. 8, 2000

[54] THERMODYNAMIC SEPARATION

[76] Inventor: William R. Stothers, 100-3553-31 St., N.W., Calgary Alberta, Canada, T2L 2K7

[21] Appl. No.: 08/889,102

[22] Filed: Jul. 7, 1997

Related U.S. Application Data

[63] Continuation-in-part of application No. PCT/CA94/00520, Sep. 28, 1994, which is a continuation-in-part of application No. 08/619,499, Mar. 26, 1996, abandoned.

[30] Foreign Application Priority Data

Oct. 1, 1993 [CA] Canada .................................. 2107504

[51] Int. Cl.$^7$ ........................................................ F25J 3/00
[52] U.S. Cl. .............................................. 62/635; 62/621
[58] Field of Search .............................. 62/621, 625, 631, 62/635, 906

[56] References Cited

U.S. PATENT DOCUMENTS

| | | | |
|---|---|---|---|
| 2,977,771 | 4/1961 | Pearce et al. . | |
| 3,226,936 | 1/1966 | VanGeuns | 62/906 X |
| 3,402,105 | 9/1968 | Sze . | |
| 3,446,870 | 5/1969 | McHarg | 62/631 |
| 3,572,046 | 3/1971 | Grotz, Jr. . | |
| 4,012,212 | 3/1977 | Kniel | 62/631 X |
| 4,043,770 | 8/1977 | Jakob | 62/635 X |
| 4,384,875 | 5/1983 | Batteux et al. | 62/635 X |
| 4,428,759 | 1/1984 | Ryan et al. | 62/635 |
| 4,453,958 | 6/1984 | Gulsby et al. | 62/621 |
| 4,464,190 | 8/1984 | Gulsby | 62/906 X |
| 4,488,890 | 12/1984 | Foerg et al. | 62/635 |
| 4,507,133 | 3/1985 | Khan et al. | 62/621 |
| 4,609,389 | 9/1986 | Karwat | 62/635 X |
| 4,696,688 | 9/1987 | Mehra | 62/635 X |
| 4,705,549 | 11/1987 | Sapper | 62/621 X |
| 4,713,940 | 12/1987 | Ranke et al. | 62/635 |
| 4,759,786 | 7/1988 | Atkinson et al. | 62/631 |
| 4,770,683 | 9/1988 | Stothers . | |
| 4,895,584 | 1/1990 | Buck et al. . | |
| 4,976,849 | 12/1990 | Soldati | 62/631 X |
| 5,152,148 | 10/1992 | Crum et al. | 62/906 X |
| 5,634,355 | 6/1997 | Cheng et al. | 62/906 X |
| 5,799,507 | 9/1998 | Wilkinson et al. | 62/621 |

FOREIGN PATENT DOCUMENTS 1792735  2/1993  U.S.S.R. ................................. 62/906

*Primary Examiner*—William Doerrler
*Attorney, Agent, or Firm*—Adrian D. Battison; Murray E. Thrift

[57] ABSTRACT

A process for separation of gases into two components of different boiling points, for example in the separation of ethane from natural gas, comprises a first separation tower V1 and a second separation tower V2. Liquid in stream 5 from a bottom of the first tower is expanded and cooled and is then communicated in stream 6 to the second tower at a lower pressure. Gas from the second tower is communicated back to the first tower so that the first component in stream 10 is extracted from the top of the first tower and the second component in stream 11 is extracted from the bottom of the second tower. A third tower V3 acts as a recycle fractionator upon the gas in stream 7 extracted from the top of the second tower with that gas being compressed into the third tower which is at high pressure. The liquid in stream 5 from the bottom of the first tower is used to cool a condenser E6 at the top of the first tower V1 and to cool the material from the recycle fractionator V3 as it is returned to the top of the first tower.

24 Claims, 1 Drawing Sheet

THERMODYNAMIC SEPARATION

This application is a Continuation-in-Part Application of PCT/CA/94/00520 application, filed Sep. 28, 1994 which was given U.S. Ser. No. 08/619,499, filed Mar. 26, 1996 now abandoned.

BACKGROUND OF THE INVENTION

The present invention relates to the separation of gases into components of differing boiling points. The invention relates more specifically to a method and an apparatus especially suited for separating propane, methane, ethane or carbon dioxide from natural gas.

The applicant's prior U.S. Pat. No. 4,770,683, issued Sep. 13, 1988 describes a process and an apparatus for distillation of two materials of differing boiling points. A process for distillation of two materials of differing boiling points particularly propane, ethane or carbon dioxide from natural gas is described in which the conventional distillation tower is divided into a first tower at higher pressure than a conventional tower and a second tower at lower pressure. Liquid drawn from the first is expanded to the lower pressure through two or more stages with cool extracted at each stage and used to cool gas withdrawn from the top of the first tower to keep the top tray at a required temperature. Gas withdrawn from the second tower is compressed and cooled for return to the first tower as a reflux. The use of the cool from the expanded liquid and the use of the two towers provides an improved thermo-dynamic efficiency and avoids the use of costly turbo-expanders.

SUMMARY OF THE INVENTION

It is one object of the present invention to provide improvements in the methods disclosed in the above patent which provide improved efficiencies.

According to the first aspect of the invention it is provided a method of separating the feed gas into a first supply component and a second supply component, the first supply component having a higher boiling point than the second supply component, the method comprising providing a first separation vessel and a second separation vessel, arranging the separation vessels such that components of a higher boiling point move upwardly in the respective separation vessel as gas toward a top of the respective vessel and such that components of a lower boiling point move downwardly in the respective separation vessel toward a bottom of the respective vessel as liquid, supplying the feed gas to one of the first and second separation vessels, transferring liquid from the bottom of the first vessel to the second vessel, transferring gas from the top of the second vessel to the first vessel, extracting gas from the top of said first vessel as the first supply component, extracting liquid from a bottom of said second vessel as the second supply component, wherein the improvement comprises providing a recycle fractionator vessel separate from the first and second vessels, transferring gas from a top of the second vessel to the recycle fractionator vessel, condensing some of the gas to liquid within the recycle fractionator vessel, extracting gas from a top of the recycle fractionator vessel, transferring the extracted gas to the first vessel, extracting liquid from a bottom of the recycle fractionator vessel and transferring the extracted liquid to the second vessel.

Preferably the method includes compressing the gas from the top of the second vessel prior to injection into the recycle fractionator vessel so that the pressure in the recycle fractionator vessel is higher than that in the first vessel.

In other embodiments, the recycle fractionator vessel is at a lower pressure than the first vessel in which case the gas from the recycle fractionator vessel is compressed, cooled and condensed before being reinjected as reflux above or below a condenser of the first vessel.

Preferably the first vessel includes a condenser comprising a plurality of vertical tubes each of the tubes having therein structured packing arranged so as to intimately mix liquid moving downwardly through the tubes with gas moving upwardly through the tubes.

Preferably liquid from the bottom of the first vessel is expanded and cooled and is passed through the condenser as a coolant for materials in the condenser of the first vessel.

According to a second aspect of the invention there is provided a method of separating a feed gas into a first supply component and a second supply component, the first supply component having a higher boiling point than the second supply component, the method comprising providing a first separation vessel and a second separation vessel, arranging the separation vessels such that components of a higher boiling point move upwardly in the respective separation vessel as gas toward a top of the respective vessel and such that components of a lower boiling point move downwardly in the respective separation vessel toward a bottom of the respective vessel as liquid, the first vessel including a condenser, supplying the feed gas to one of the first and second separation vessels, transferring liquid from the bottom of the first vessel to the second vessel, transferring gas from the top of the second vessel to the first vessel, extracting gas from the top of said first vessel as the first supply component, extracting liquid from a bottom of said second vessel as the second supply component, wherein the improvement comprises providing in the condenser a plurality of vertical tubes each of the tubes having therein structured packing arranged so as to intimately mix liquid moving downwardly through the tubes with gas moving upwardly through the tubes.

One embodiment of the invention will be described hereinafter in conjunction with the accompanying drawing in which:

DETAILED DESCRIPTION

Figure 1:
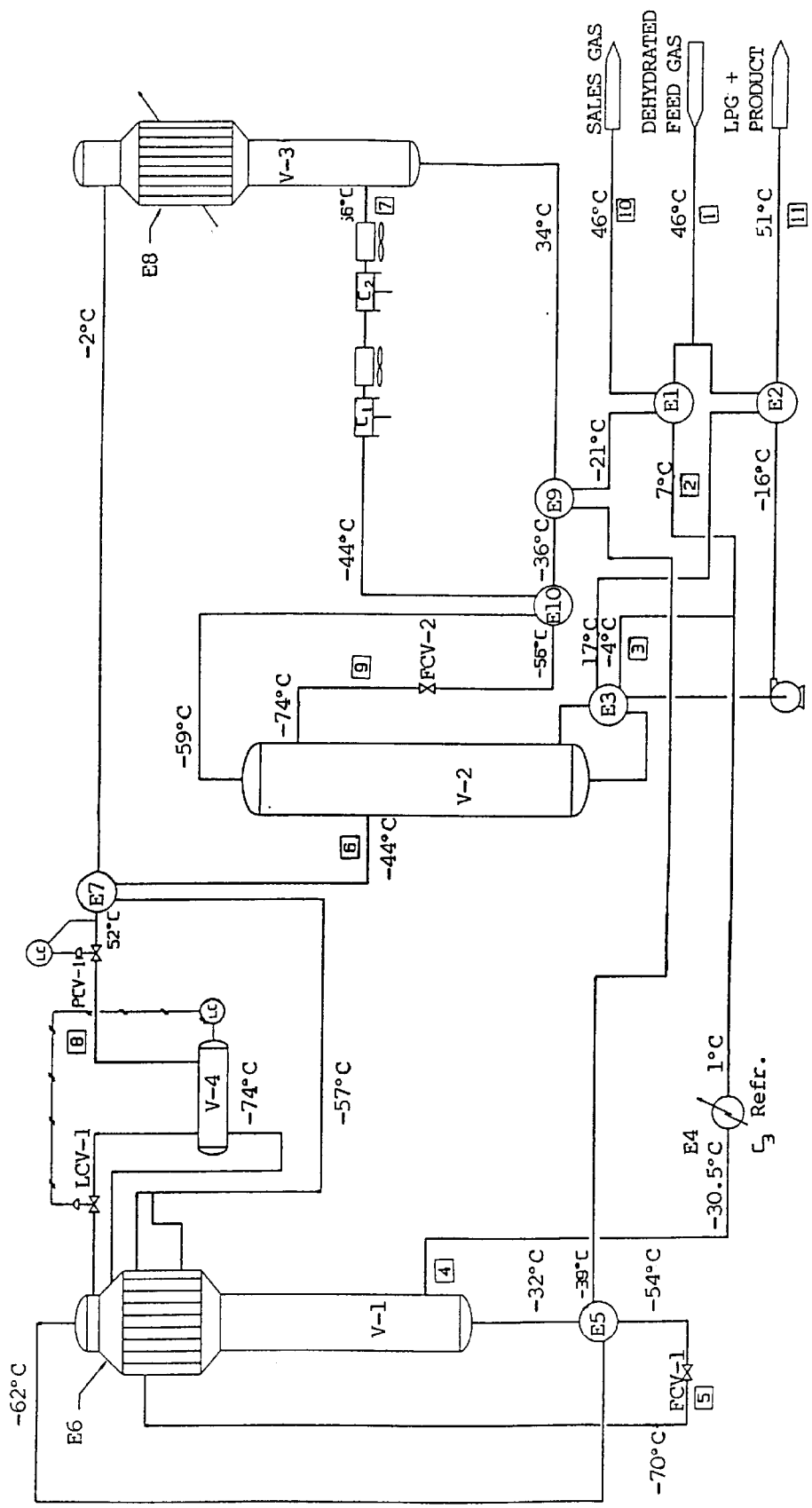
FIG. 1 is a schematic illustration of the elements of the process with the temperatures of the various streams indicated.

The present process can be used for separating various different components from a supply gas of different boiling points and the following description shows only one example which is used for the separation of propane from natural gas. The same techniques can be used for separation of ethane or carbon dioxide from natural gas although of course the process parameters must be modified in accordance with known principles in order to obtain the required separations.

The process is shown schematically including the various vessels and heat exchangers by which the process is carried out. In addition the drawing shows the temperatures of the various streams of gas and liquid at the various points throughout the process in accordance with the example described herein and the various streams are numbered 1 through 11. The tables 1 through 11 set out hereinafter show the process conditions and material contents of each of the respective numbered streams which are identified on the above drawing. It will of course be appreciated that the process conditions relate only to one single example and similar conditions can be calculated for other examples of the process.

The process therefore provides in general separation vessels V1 and V2 which comprise a gas fractionator V1 and a deethanizer V2 respectively. The process further includes recycle fractionator vessel V3 and a reflux accumulator vessel V4. The process is divided into a number of streams of the materials which pass from the vessels as shown including streams 1 through 11. The stream 1 constitutes the feed gas stream, the stream 10 constitutes the sales or separated gas, and the stream 11 constitutes the remaining gas after separation of the sales gas, in this case indicated as LPG+ product. The streams pass through a number of heat exchangers indicated at E1 through E8, the operation of which is described in more detail hereinafter. The process further includes compressors C1 and C2 together with control valves FCV1, FCV2, PCV1 and LCV1. The valves LCV1 and PCV1 are controlled by process control elements including a level control device LC and a pressure control device PC respectively.

The temperatures shown on the Process Flow Drawing and the Material Balances set out in Tables 1 through 11 hereinafter reflect design for an ambient temperature of 45 C.

The Feed Gas Stream 1, is dehydrated in a molecular sieve dehydrator or other dehydrator (not shown) that will achieve a water dew point of less than −100 C. The feed gas is divided into two steams 2 and 3.

The major portion of the Feed Gas Stream 2, is cooled in a Gas/Gas Heat Exchanger E1 obtaining cool from the Sales Gas. The remaining portion of the Feed Gas Stream 3 is cooled by taking cool from the LPG + product and from the Deethanizer Reboiler E3. The cooled feeds are then recombined and chilled in the Chiller E4 obtaining cool from a propane refrigerant system of conventional construction. This chilled feed Stream 4 is then fed to the Gas Fractionator V1. The streams 2 and 3 are divided since this allows the control of the flow rate of the stream 3 to be used to control heat to the reboiler E3.

The Gas Fractionator V1 is a Refluxed Absorber distillation column with a condenser E6 at the top and typically 10 to 16 trays below the condenser and above the feed. Structured packing or dumped packing may alternately be used rather than valve trays; usually packed towers are preferred for smaller diameter towers. The column is arranged so that a temperature and pressure gradient is defined therein causing the components in the column to separate into a condensed liquid moving down the tower to the bottom and a lighter gas moving up the column to the top. Further details of this type of separation column are disclosed in the aforementioned prior patent of the present inventor. The parameters of the column in theoretical terms are set out in table 12 hereinafter.

Liquid from the bottom of the Gas Fractionator V1 is sub cooled in Subcooler E5 taking cool from the Sales gas stream 10. The subcooled liquid is then flashed Stream 5 and used as refrigerant for the Gas Fractionator Condenser E6. This condenser consists of vertical large diameter tubes, typically 75 mm to 150 mm in diameter. The tubes are packed with structured packing. Structured packing is a known material used in columns in place of the conventional trays but in this case used in the condenser tubes. The structured packing is of a construction known in the art and comprises a mesh material which acts to maintain the upwardly moving gas in contact with the downwardly moving liquid by moving the liquid inwardly from the wall of the tube.

Process vapor from the top tray of the Gas Fractionator V1 enters the bottom of the packed tubes and is partially condensed while flowing up through the condenser. The condensed liquid plus reflux liquid that is sprayed into the top of the tubes flows down through the packed tubes and contacts the Residue Gas vapor before it leaves the Gas Fractionator.

The shell side, that is the area of the condenser outside the tubes, of the Gas Fractionator Condenser E6 is partially flooded with flashed subcooled liquid Stream 5. Flashed vapor from Stream 5 and vapor that is vaporized due to heat taken from the E6 tubes gathers at the top of Condenser E6 and is taken to the Reflux Condenser E7 in stream 6. Liquid that is not vaporized in Condenser E6 gathers at the bottom on the shell side of that exchanger and is taken through a seal leg L1 to join the vapor leaving the top of the exchanger. The seal leg acts to maintain a high liquid level in this exchanger so that the tubes are flooded as much as practical.

The flashed Gas Fractionator Bottoms are then further flashed Stream 6 in the Reflux Condenser E7 then enter approximately the midpoint of the Deethanizer or second separation vessel V2. The Deethanizer has 12 to 20 trays or it could alternately use packing. The theoretical parameters for the vessel V2 are set out in table 13. A novel type of reflux to the Deethanizer is described below. As described above, heat is supplied to the Deethanizer Reboiler E3 from the feed gas stream 3. The Deethanizer operates at an abnormally low pressure of 120 to 300 KPa (abs). This low pressure allows its feed to be used as refrigerant for the Gas Fractionator Condenser E6 and Reflux Condenser E7. Much better separation is also achieved at this temperature and cool can be recovered from the Reboiler E3 and from the LPG+ Product.

Overhead separated gas from the Deethanizer V2 is compressed using a screw compressor and a reciprocating compressor (or alternately two reciprocating stages or a multistage centrifugal compressor) C1 and C2 to the Recycle Fractionator V3.

The Recycle Fractionator is a gas fractionator that uses propane refrigerant to supply cool to its Recycle Fractionator Condenser E8. The Recycle Fractionator processes the recycle gas into a very lean overhead gas having some methane, a high ethane content, a small amount of propane and very little butane plus. The Recycle Fractionator Overhead Gas is totally condensed (at design conditions) in the Reflux Condenser E7 using cool from the Deethanizer Feed Stream 6. The above Reflux Stream 8 then flows through a Pressure Control Valve PCV1 which maintains the operating pressure of the Recycle Fractionator V3. Reflux Stream 8 flashes at the lower operating pressure of the Reflux Accumulator V4 which is typically at a pressure of 300 KPa above the operating pressure of the Gas Fractionator V1. This additional pressure typically is sufficient to lift the reflux to the top of the Gas Fractionator and distribute it through spray nozzles to each tube in the Gas Fractionator Condenser E6. Vapor from the Reflux Accumulator V4, joins the Residue Gas at the top of the Gas Fractionator after flowing through a Level Control Valve LCV1; this valve maintains a constant level in the Reflux Accumulator V4 by varying the back pressure on it.

Liquid from the bottom of the Recycle Fractionator V3 is subcooled in Subcoolers E9 and E10, which take cool from the Residue Gas and the Recycle Gas, respectively. (In some applications of the process, it may be advisable to omit Subcooler E9, and obtain all the subcooling from the Recycle Gas in E10. This would provide warmer recycle gas which may relax a metallurgy restriction for the Recycle Compressor C1. The subcooled liquid from the Recycle Fractionator is then flashed to the operating pressure of the Deethanizer V2 and used as reflux at the top of the Deethanizer.

There are many ways to control this process. Use of distributed control is definitely worthwhile for most applications particularly large plants and plants where there is a variation in flow or composition. One method of controlling the process is to control the flow in Flow Control Valve FCV1 in order to maintain a constant throughput and constant suction pressure for the Recycle Compressor C1 and C2. This will require a large reservoir of liquid in the bottom of the Gas Fractionator V1. It would then be proposed to maintain the level of the liquid in the base of the Gas Fractionator V1 by varying the height of the refrigerant in the Chiller E4. Of course, there would have to be a minimum level that would be maintained in vessel V1 by overriding the operation of FCV1 and operating it as a level control valve.

Normally, it is advisable to maintain a constant flow of reflux Stream 9 to the Deethanizer V2 using FCV-2; this would require a reservoir of reflux liquid in the base of V3. Then the liquid level in the base of V3 could be maintained by varying the back pressure on this vessel using PCV1. A small decrease in back pressure would quickly lower the liquid level in the base of V3. Depending upon the process configuration, there is a limit on how low the back pressure on V3 can be lowered and still maintain sufficient pressure for reflux to flow to V1. If the lowest back pressure for V3 is reached and the liquid level in the base of V3 is still too high, it may be lowered by lowering the refrigerant level in the Gas Fractionator Condenser E8. Similar to valve FCV1, valve FCV2 would be over-ridden as a level control valve if the liquid level in V3 reached a minimum level. There would also be a maximum operating pressure for the Recycle Fractionator based upon its design pressure and/or the maximum discharge pressure of the Recycle Compressor C1 and C2.

Note that control of the back pressure on the Recycle Fractionator using valve PCV-1 is so sensitive that, in practice, it can best be done by having two valves in parallel for PCV-1. Control is achieved by adjusting the smaller of the two valves then when it is either fully open or fully closed, the larger valve is adjusted to put the smaller valve back in control.

The specified ethane content of the LPG+ product could be measured using a process chromatography or indicated by measuring the reboiler return temperature. The ethane content of the LPG+ Product is controlled by controlling the flow of heat to the Deethanizer Reboiler E3. This can be done by controlling the flow rate of Stream 3 or the ratio of the flows of Stream 3 and Stream 2.

With the above means of process control, the flow rate through the Recycle Compressor C1 and C2, tends to be maintained at a constant rate as the plant is turned down. This phenomenon is enhanced if the refrigerant temperature for the Feed Chiller can be reduced as the plant is turned down and the load on the refrigeration compressor decreases. In this manner, as the plant is turned down, that is, the flow rate of Stream 1 decreases; the flow rates of Streams 7, 8, and 9 tend to be maintained at a constant rate. That causes an increase of the reflux ratios for the Gas Fractionator and Deethanizer. The increase in these reflux ratios results in a higher percentage propane recovery as the plant is turned down. Note that most cryogenic processes have a loss in recovery as the plant is turned down due to a loss in turbo-expander efficiency when the plant is not operated at the design rate.

In optimizing the operation of a plant, the flow and composition of the two reflux streams, Stream 8 and 9, can be measured and analyzed. Then the flow setting for valve FCV2, controlling the reflux flow to the Deethanizer, can be adjuster to obtain an optimum recovery. Putting plant operating information into a computer thermodynamic model would quickly show optimum flow setting for FCV-2 for various plant operating conditions. In a similar manner, the interstage refrigeration level can be optimized to determine an optimum overhead temperature for the Recycle Fractionator V3.

Tables 12, 13 and 14 show theoretical calculations for the parameters within the three separation vessels that is the gas fractionator or first vessel V1, the D ethanizer or second vessel V2 and the recycle fractionator vessel V3. The column on the left hand side of each table refers to the individual trays of the vessel when calculated on a theoretical basis. Thus the pressure and temperature of each tray is indicated, but this assumes that the trays are of theoretically 100% efficiency, whereas this cannot be achieved in practice. In practice, therefore, the number of trays will be increased from the theoretical trays set forth in the tables.

The example as described above has the following advantages:

1. The Recycle Gas Fractionator allows higher product recoveries to be achieved with less energy requirement, less compressor capital cost, and (for moderate to large plants) less capital cost than the Two Tower Process in the above patent.

2. When this process is used for propane recovery, it is easier to control than the Three Tower Process in the former patent which had a large recycle of ethane between its Economizer Tower and the Deethanizer.

3. Like most cryogenic processes, this process can be designed for ethane recovery then operated in a manner in which only propane plus product (LPG + product) is recovered. Thus the equipment configuration for ethane recovery is very similar to that shown for propane recovery.

4. The use of the Recycle Fractionator allows the Gas Fractionator to operate at a much lower operating pressure while achieving optimum propane recovery. In the example shown, the Gas Fractionator operates at 1700 KPa (abs) which is only marginally above the required Sales Gas Pressure. Thus the Feed Gas only has to be compressed up to the Sales Gas Pressure plus a small margin for process pressure drop. Turbo-expander processes would typically require the Plant Inlet to be compressed to 3500 to 5000 KPa. Thus in situations where the Feed Gas must be compressed and the Sales Gas Pressure is low, this process requires a minimum of compressor power compared to turbo-expander and Joule-Thompson processes. Because the recycle compressor in this process is actually acting as a refrigerant compressor providing refrigeration to the Gas Fractionator Condenser and to the Feed, much less power is required than Cascade Refrigeration and Dual Refrigerant Processes.

5. Filling the tubes in the "in-tower" condensers in the Gas Fractionator and Recycle Fractionator with structured packing results in mass transfer being achieved in the Condenser. The process simulations for these towers show all the condensing being done above the last stage of distillation, but, in essence, there is at least one stage of separation in the Gas Fractionator Condenser and at least three stages for the Recycle Fractionator for the particular example shown. Having these stages of separation in the condenser results in a lower inlet temperature to the condenser which results in a bigger log mean temperature difference for the condenser. It also means that cooling is supplied to the top two or more theoretical trays in the distillation columns rather than just the top theoretical stage as in a conventional distillation column. These factors result in a better product recovery than calculated with only one theoretical stage of condenser as shown in the process simulations.

6. The structured packing in the Condenser tubes also improved mixing and heat transfer within the tube which is the limiting heat transfer film coefficient. Better heat transfer in these condensers also relates to better product recovery.

| Stream | Table 1 | Table 2 | Table 3 |
|---|---|---|---|
| Description | Dry Gas | | |
| Vapour frac. | 1.0000 | 0.8845 | 0.8370 |
| Temperature C | 56.0000* | 6.9172 | −4.0232 |
| Pressure kPA | 1735.0000* | 1700.0000 | 1700.0000 |
| MolarFlow kgmole/h | 2882.3093 | 1167.3093 | 1465.0000* |
| Mass Flow kg/h | 77801.4219 | 31508.8750 | 39544.3633 |
| LiqVol Flow m3/h | 195.4461 | 79.1539 | 99.3400 |
| Enthalpy kJ/h | 3.77418E+07 | 9.69945E+06 | 1.02077E+07 |
| Density kg/m3 | 18.5694 | 24.4133 | 26.7694 |
| Mole Wt. | 26.9927 | 26.9927 | 26.9927 |
| Spec.Heat kJ/kgmole - C | 57.7713 | 57.6777 | 58.1262 |
| Therm Cond W/m-K | 0.0320 | — | — |
| Viscosity cP | 0.0121 | — | — |
| Z Factor | 0.9216 | — | — |
| Sur Tension dyne/cm | — | — | — |
| Std Density kg/m3 | — | — | — |
| Nitrogen kgmole/h | 17.0506 | 6.9053 | 8.6664 |
| CO2 kgmole/h | 10.9471 | 4.4335 | 5.5641 |
| Methane kgmole/h | 1801.2294 | 729.4817 | 915.5163 |
| Ethane kgmole/h | 380.5072 | 154.1020 | 193.4015 |
| Propane kgmole/h | 341.2990 | 138.2230 | 173.4730 |
| i-Butane kgmole/h | 118.3122 | 47.9154 | 60.1349 |
| n-Butane kgmole/h | 107.3654 | 43.4820 | 54.5709 |
| i-Pentane kgmole/h | 38.6405 | 15.6491 | 19.6399 |
| n-Pentane kgmole/h | 35.7183 | 14.4656 | 18.1546 |
| n-Hexane kgmole/h | 15.7251 | 6.3685 | 7.9926 |
| n-Heptane kgmole/h | 11.7838 | 4.7724 | 5.9894 |
| n-Octane kgmole/h | 3.1648 | 1.2817 | 1.6086 |
| n-Nonane kgmole/h | 0.5230 | 0.2118 | 0.2658 |
| n-Decane kgmole/h | 0.0399 | 0.0161 | 0.0203 |
| n-C11 kgmole/h | 0.0025 | 0.0010 | 0.0012 |
| n-C12 kgmole/h | 0.0001 | 0.0001 | 0.0001 |
| n-C13 kgmole/h | 0.0000 | 0.0000 | 0.0000 |
| H20 kgmole/h | 0.0000 | 0.0000 | 0.0000 |
| TOTAL: kgmole/h | 2882.3093 | 1167.3093 | 1465.0000* |

| Stream | Table 4 | Table 5 | Table 6 |
|---|---|---|---|
| Description | | | |
| Vapour frac. | 0.7218 | 0.1671 | 0.3721 |
| Temperature C | −31.0000* | −70.1207 | −44.0983 |
| Pressure kPA | 1675.0000 | 180.0000 | 150.0000* |
| MolarFlow kgmole/h | 2632.3093 | 893.2408 | 893.2408 |
| Mass Flow kg/h | 71053.2344 | 40090.4297 | 40090.4297 |
| LiqVol Flow m3/h | 178.4939 | 79.7143 | 79.7143 |
| Enthalpy kJ/h | 1.01545E+07 | −7.49161E+06 | −2.53334E+06 |
| Density kg/m3 | 33.7563 | 28.0824 | 9.6271 |
| Mole Wt. | 26.9927 | 44.8820 | 44.8820 |
| Spec.Heat kJ/kgmole-C | 58.7798 | 85.4382 | 85.3941 |
| Therm Cond W/m-K | — | — | — |
| Viscosity cP | — | — | — |
| Z Factor | — | — | — |
| Sur Tension dyne/cm | — | — | — |
| Std Density kg/m3 | — | — | — |
| Nitrogen kgmole/h | 15.5717 | 0.2793 | 0.2793 |
| CO2 kgmole/h | 9.9976 | 2.0458 | 2.0458 |
| Methane kgmole/h | 1644.9980 | 119.2493 | 119.2493 |
| Ethane kgmole/h | 347.5035 | 156.8203 | 156.8203 |
| Propane kgmole/h | 311.6961 | 312.3052 | 312.3052 |
| i-Butane kgmole/h | 108.0503 | 108.0492 | 108.0492 |
| n-Butane kgmole/h | 98.0529 | 98.0529 | 98.0529 |
| i-Pentane kgmole/h | 35.2890 | 35.2890 | 35.2890 |
| n-Pentane kgmole/h | 32.6202 | 32.6202 | 32.6202 |
| n-Hexane kgmole/h | 14.3612 | 14.3612 | 14.3612 |
| n-Heptane kgmole/h | 10.7618 | 10.7618 | 10.7618 |
| n-Octane kgmole/h | 2.8903 | 2.8903 | 2.8903 |
| n-Nonane kgmole/h | 0.4777 | 0.4777 | 0.4777 |
| n-Decane kgmole/h | 0.0364 | 0.0364 | 0.0364 |
| n-C11 kgmole/h | 0.0022 | 0.0022 | 0.0022 |
| n-C12 kgmole/h | 0.0001 | 0.0001 | 0.0001 |
| n-C13 kgmole/h | 0.0000 | 0.0000 | 0.0000 |
| H20 kgmole/h | 0.0000 | 0.0000 | 0.0000 |
| TOTAL: kgmole/h | 2632.3093 | 893.2408 | 893.2408 |

| Stream | Table 7 | Table 8 | Table 9 |
|---|---|---|---|
| Description | | | |
| Vapour frac. | 1.0000 | 0.1997 | 0.1454 |
| Temperature C | 56.0000* | −66.9438 | −74.2621* |
| Pressure kPA | 3500.0000* | 1954.0000* | 150.0000* |
| MolarFlow kgmole/h | 487.6037 | 289.9399 | 197.4185* |
| Mass Flow kg/h | 14585.5352 | 7300.8345 | 7276.8691 |
| LiqVol Flow m3/h | 37.3217 | 20.7835 | 16.5181 |
| Enthalpy kJ/h | 5.90514E+06 | −675411.7663 | −1.38989E+06 |
| Density kg/m3 | 49.1620 | 132.7514 | 22.7950 |
| Mole Wt. | 29.9127 | 25.1805 | 36.8601 |
| Spec.Heat kJ/kgmole-C | 71.5176 | 69.4774 | 75.8204 |
| Therm Cond W/m-K | 0.0307 | — | — |
| Viscosity cP | 0.0123 | — | — |
| Z Factor | 0.7782 | — | — |
| Sur Tension dyne/cm | — | — | — |
| Std Density kg/m3 | — | — | — |
| Nitrogen kgmole/h | 0.2946 | 0.2793 | 0.0152* |
| CO2 kgmole/h | 2.4630 | 2.0452 | 0.4173* |
| Methane kgmole/h | 133.2528 | 119.2292 | 14.0035* |
| Ethane kgmole/h | 226.4655 | 152.2132 | 74.0846* |
| Propane kgmole/h | 124.8736 | 16.1728 | 108.6387* |
| i-Butane kgmole/h | 0.2331 | 0.0002 | 0.2374* |
| n-Butane kgmole/h | 0.0211 | 0.0000 | 0.0217* |
| i-Pentane kgmole/h | 0.0000 | 0.0000 | 0.0000* |
| n-Pentane kgmole/h | 0.0000 | 0.0000 | 0.0000* |
| n-Hexane kgmole/h | 0.0000 | 0.0000 | 0.0000* |
| n-Heptane kgmole/h | 0.0000 | 0.0000 | 0.0000* |
| n-Octane kgmole/h | 0.0000 | 0.0000 | 0.0000* |
| n-Nonane kgmole/h | 0.0000 | 0.0000 | 0.0000* |
| n-Decane kgmole/h | 0.0000 | 0.0000 | 0.0000* |
| n-C11 kgmole/h | 0.0000 | 0.0000 | 0.0000* |
| n-C12 kgmole/h | 0.0000 | 0.0000 | 0.0000* |
| n-C13 kgmole/h | 0.0000 | 0.0000 | 0.0000* |
| H20 kgmole/h | 0.0000 | 0.0000 | 0.0000* |
| TOTAL: kgmole/h | 487.6037 | 289.9399 | 197.4185* |

| Stream | Table 10 | Table 11 |
|---|---|---|
| Description | Residue Gas | |
| Vapour frac. | 1.0000 | 0.0000 |
| Temperature C | 46.0000* | 51.0000* |
| Pressure kPa | 1569.0000 | 1450.0000* |
| MolarFlow kgmole/h | 2029.0081 | 603.0556 |
| Mass Flow kg/h | 83263.6406 | 32781.7617 |
| LiqVol Flow m3/h | 119.5630 | 58.9106 |
| Enthalpy kJ/h | 2.20817E+07 | 1.24168E+06 |
| Density kg/m3 | 11.5855 | 516.1233 |
| Mole Wt. | 18.8583 | 54.3594 |
| Spec.Heat kJ/kgmole-C | 41.9712 | 148.7041 |
| Therm Cond W/m-K | 0.0351 | 0.0826 |

-continued

| | | |
|---|---|---|
| Viscosity cP | 0.0121 | 0.1149 |
| Z Factor | 0.9625 | 0.0567 |
| Sur Tension dyne/cm | — | 6.8261 |
| Std Density kg/m3 | — | 563.0956 |
| Nitrogen kgmole/h | 15.5717 | 0.0000 |
| CO2 kgmole/h | 9.9971 | 0.0000 |
| Methane kgmole/h | 1644.9779 | 0.0000 |
| Ethane kgmole/h | 342.8964 | 4.4395 |
| Propane kgmole/h | 15.5637 | 296.0702 |
| i-Butane kgmole/h | 0.0012 | 108.0536 |
| n-Butane kgmole/h | 0.0000 | 98.0534 |
| i-Pentane kgmole/h | 0.0000 | 35.2890 |
| n-Pentane kgmole/h | 0.0000 | 32.6202 |
| n-Hexane kgmole/h | 0.0000 | 14.3612 |
| n-Heptane kgmole/h | 0.0000 | 10.7618 |
| n-Octane kgmole/h | 0.0000 | 2.8903 |
| n-Nonane kgmole/h | 0.0000 | 0.4777 |
| n-Decane kgmole/h | 0.0000 | 0.0364 |
| n-C11 kgmole/h | 0.0000 | 0.0022 |
| n-C12 kgmole/h | 0.0000 | 0.0001 |
| n-C13 kgmole/h | 0.0000 | 0.0000 |
| H20 kgmole/h | 0.0000 | 0.0000 |
| TOTAL: kgmole/h | 2029.0081 | 603.0556 |

TABLE 12

GAS FRACTIONATOR
Reflux Ration: 0.14975

| | | | Flow Rates | | | |
|---|---|---|---|---|---|---|
| Stg | Press | Temp | Liquid | Vapour | (kgmole/h) | |
| No. | kPa | C | GJ/h | | Feed | Draws | Duty |
| 1 | 1654.0 | −62.2 | 303.8 | | 289.9 | 2029.0V | — |
| | | | 1.959 | | | | |
| 2 | 1661.7 | −50.8 | 250.9 | 2042.9 | | | |
| 3 | 1669.3 | −44.3 | 223.3 | 1989.9 | | | |
| 4 | 1677.0 | −40.8 | 211.4 | 1962.4 | | | |
| 5 | 1684.7 | −39.0 | 200.1 | 1950.5 | | | |
| 6 | 1692.3 | −37.2 | 166.5 | 1939.2 | | | |
| 7 | 1700.0 | −31.9 | 893.2L | 1905.6 | | | 2632.3 |

TABLE 13

DEETHANIZER

| | | | Flow Rates | | | |
|---|---|---|---|---|---|---|
| Stg | Press | Temp | Liquid | Vapour | (kgmole/h) | |
| No. | kPa | C | GJ/h | | Feed | Draws | Duty |
| 1 | 150.0 | −58.9 | 166.4 | | 197.4 | 487.6V | |
| 2 | 151.4 | −54.2 | 163.8 | 456.6 | | | |
| 3 | 152.7 | −51.7 | 152.6 | 454.0 | | | |
| 4 | 154.1 | −43.8 | 718.1 | 442.8 | 893.2 | | |
| 5 | 155.5 | −37.7 | 744.0 | 115.0 | | | |
| 6 | 156.8 | −36.1 | 748.8 | 140.9 | | | |
| 7 | 158.2 | −34.4 | 752.5 | 145.8 | | | |
| 8 | 159.5 | −32.0 | 757.7 | 149.4 | | | |
| 9 | 160.9 | −28.9 | 765.1 | 154.7 | | | |
| 10 | 162.3 | −25.6 | 773.5 | 162.0 | | | |
| 11 | 163.6 | −22.4 | 779.4 | 170.5 | | | |
| 12 | 165.0 | −17.2 | 3.654 | 176.4 | | | 603.1L |

TABLE 14

RECYCLE FRACTIONATOR
Reflux Ration: 1.07113

| | | | Flow Rates | | | |
|---|---|---|---|---|---|---|
| Stg | Press | Temp | Liquid | Vapour | (kgmole/h) | |
| No. | kPa | C | GJ/h | | Feed | Draws | Duty |
| 1 | 3500.0 | −2.0 | 310.6 | | | 290.0V | — |
| | | | 3.151 | | | | |
| 2 | 3505.0 | 14.9 | 312.5 | 600.6 | | | |
| 3 | 3510.0 | 22.4 | 305.6 | 602.5 | | | |
| 4 | 3515.0 | 26.9 | 300.4 | 595.6 | | | |
| 5 | 3520.0 | 29.8 | 297.7 | 590.5 | | | |
| 6 | 3525.0 | 31.5 | 296.5 | 587.8 | | | |
| 7 | 3530.0 | 32.6 | 296.1 | 586.6 | | | |
| 8 | 3535.0 | 33.2 | 296.1 | 586.1 | | | |
| 9 | 3540.0 | 33.6 | 296.2 | 586.1 | | | |
| 10 | 3545.0 | 33.9 | 296.3 | 586.2 | | | |
| 11 | 3550.0 | 34.1 | | 586.4 | | 487.6 | 197.6L |

I claim:

1. A method of separating the feed gas into a first supply component and a second supply component, the first supply component having a lower boiling point than the second supply component, the method comprising:

providing a first separation vessel and a second separation vessel, arranging the separation vessels such that components of a lower boiling point move upwardly in the respective separation vessel as gas toward a top of the respective vessel and such that components of a higher boiling point move downwardly in the respective separation vessel toward a bottom of the respective vessel as liquid, supplying the feed gas to one of the first and second separation vessels, transferring liquid from the bottom of the first vessel to the second vessel, extracting gas from the top of said first vessel as the first supply component, extracting liquid from a bottom of said second vessel as the second supply component, wherein the improvement comprises providing a recycle fractionator vessel separate from the first and second vessels, transferring gas from a top of the second vessel to the recycle fractionator vessel, condensing some of the gas to liquid within the recycle fractionator vessel, extracting gas from a top of the recycle fractionator vessel condensing the extracted gas and transferring the extracted gas when condensed to the first vessel as a cooled reflux, and extracting liquid from a bottom of the recycle fractionator vessel and transferring the extracted liquid to the second vessel as a cooled reflux.

2. The method according to claim 1 including compressing the gas from the top of the second vessel prior to injection into the recycle fractionator vessel such that the pressure in the recycle fractionator vessel is higher than that in the second vessel.

3. The method according to claim 1 wherein the first vessel includes a condenser and wherein the condenser comprises a plurality of vertical tubes each having therein structured packing arranged so as to intimately mix liquid moving downwardly through the tubes with gas moving upwardly through the tubes.

4. The method according to claim 3 wherein liquid from the bottom of the first vessel is expanded and cooled and is passed through the condenser as a coolant for materials in the condenser.

5. The method according to claim 4 wherein liquid in the condenser is extracted for transmission to the second vessel through a transmission duct, the duct including a vertical portion having a bottom end connected to a bottom of the condenser such that the vertical portion acts as a seal leg to maintain the liquid in the condenser at a required height.

6. The method according to claim 5 wherein the transfer duct includes a second outlet pipe connected to a top of the condenser for extracting gas therefrom.

7. The method according to claim 1 wherein the liquid from the recycle fractionator vessel is cooled and expanded prior to return to the second vessel.

8. The method according to claim 7 wherein the liquid from the recycle fractionator vessel after cooling is recycled to the second vessel at a position thereon higher than the position to which the liquid from the first vessel is transferred.

9. The method according to claim 1 wherein the gas from the recycle fractionator vessel is cooled and expanded and partly condensed in a reflux accumulator, liquid and gas from the reflux accumulator being separately communicated to the first vessel.

10. The method according to claim 9 wherein the first vessel includes a condenser and wherein the liquid from the reflux accumulator is injected into the first vessel as a reflux above the condenser thereof.

11. The method according to claim 9 wherein the gas from the recycle fractionator vessel is cooled using cool from the liquid taken from the first vessel.

12. A method of separating a feed gas into a first supply component and a second supply component, the first supply component having a higher boiling point than the second supply component, the method comprising providing a first separation vessel and a second separation vessel, arranging the separation vessels such that components of a lower boiling point move upwardly in the respective separation vessel as gas toward a top of the respective vessel and such that components of a higher boiling point move downwardly in the respective separation vessel toward a bottom of the respective vessel as liquid, the first vessel including a condenser, supplying the feed gas to one of the first and second separation vessels, transferring liquid from the bottom of the first vessel to the second vessel, transferring gas from the top of the second vessel to the first vessel, extracting gas from the top of said first vessel as the first supply component, extracting liquid from a bottom of said second vessel as the second supply component, wherein the improvement comprises providing in the condenser a plurality of vertical tubes each of the tubes having therein structured packing arranged so as to intimately mix liquid moving downwardly through the tubes with gas moving upwardly through the tubes.

13. In a method of separating a feed gas into a first supply component and a second supply component, the first supply component having a lower boiling point than the second supply component, the method comprising
providing a first separation vessel and a second separation vessel at a pressure lower than that of the first, each of the separation vessels being arranged such that components of a lower boiling point move upwardly in the respective separation vessel as gas toward a top of the respective vessel and such that components of a higher boiling point move downwardly in the respective separation vessel toward a bottom of the respective vessel as liquid,
supplying the feed gas to the first separation vessel,
transferring liquid from the bottom of the first vessel to the second vessel as a feed thereto,
extracting gas from the top of said first vessel as the first supply component,
and extracting liquid from the bottom of said second vessel as the second supply component, THE IMPROVEMENT COMPRISING IN THE STEPS OF:
providing a recycle fractionator vessel separate from the first and second vessels at a pressure higher than that of the second vessel;
extracting gas from the top of the second vessel, compressing the gas and supplying the compressed gas as a feed to the recycle fractionator vessel for fractionation by the recycle fractionator vessel into a top gas stream and a bottom liquid stream;
condensing and sub-cooling the top gas stream and feeding the sub-cooled condensed top stream to the first vessel as a cooled reflux;
and sub-cooling the bottom liquid stream and feeding the sub-cooled bottom liquid stream to the second vessel as a cooled reflux.

14. The method according to claim 13 wherein the bottom liquid stream is cooled by extracting cool from the gas from the top of the second vessel prior to feeding into the recycle fractionator vessel.

15. The method according to claim 13 wherein the first vessel includes
a condenser and wherein the condensed top stream is fed to the condenser.

16. The method according to claim 15 wherein the condensed top stream prior to feeding to the condenser is collected in a reflux accumulator allowing separation of liquid and gas therein, and wherein the liquid separated in the reflux accumulator is communicated to the condenser of the first vessel and the gas separated in the reflux accumulator is communicated to the first vessel above the condenser separately from the liquid.

17. The method according to claim 15 wherein the condenser comprises a plurality of vertical tubes each having therein structured packing arranged so as to intimately mix liquid moving downwardly through the tubes with gas moving upwardly through the tubes.

18. The method according to claim 15 wherein liquid from the bottom of the first vessel is expanded and cooled and is passed through the condenser as a coolant for materials in the condenser.

19. The method according to claim 18 wherein the liquid in the condenser is extracted for feeding to the second vessel through a duct, the duct including a vertical portion having a bottom end connected to a bottom of the condenser such that the vertical portion acts as a seal leg to maintain the liquid in the condenser at a required height.

20. The method according to claim 19 wherein the duct includes a second outlet pipe connected to a top of the condenser for extracting gas therefrom.

21. The method according to claim 13 wherein the recycle fractionator vessel includes a condenser.

22. The method according to claim 13 wherein the bottom liquid stream from the recycle fractionator vessel after cooling is fed to the second vessel as the cooled reflux at a position thereon higher than the position to which the liquid from the first vessel is fed.

23. The method according to claim 13 wherein the top gas stream from the recycle fractionator vessel is cooled using cool from the liquid taken from the first vessel prior to feeding to the second vessel.

24. The method according to claim 15 including providing in the condenser a plurality of vertical tubes each of the tubes having therein structured packing arranged so as to intimately mix liquid moving downwardly through the tubes with gas moving upwardly through the tubes.

* * * * *